United States Patent
Vartiainen et al.

(10) Patent No.: US 11,608,232 B2
(45) Date of Patent: Mar. 21, 2023

(54) GROUPING STATION FOR LOADING PALLETS

(71) Applicant: ACTIW OY, Naarajarvi (FI)

(72) Inventors: Jari Vartiainen, Naarajarvi (FI); Jukka Pakkanen, Saynatsalo (FI); Joonas Valo, Kuopio (FI)

(73) Assignee: ACTIW OY, Naarajarvi (FI)

( * ) Notice: Subject to any disclaimer, the term of this patent is extended or adjusted under 35 U.S.C. 154(b) by 153 days.

(21) Appl. No.: 16/771,275

(22) PCT Filed: Feb. 14, 2019

(86) PCT No.: PCT/FI2019/050118
§ 371 (c)(1),
(2) Date: Jun. 10, 2020

(87) PCT Pub. No.: WO2019/158822
PCT Pub. Date: Aug. 22, 2019

(65) Prior Publication Data
US 2020/0391959 A1    Dec. 17, 2020

(30) Foreign Application Priority Data

Feb. 16, 2018  (FI) ...................................... 20185145

(51) Int. Cl.
*B65G 47/68*  (2006.01)
*B65G 47/244*  (2006.01)
(Continued)

(52) U.S. Cl.
CPC ......... *B65G 47/682* (2013.01); *B65G 47/244* (2013.01); *B65G 47/53* (2013.01);
(Continued)

(58) Field of Classification Search
CPC ........ B65G 15/12; B65G 15/22; B65G 17/26; B65G 47/082; B65G 47/244; B65G 47/53;
(Continued)

(56) References Cited

U.S. PATENT DOCUMENTS 3,173,557 A * 3/1965 Eliassen ............... B65G 47/503
                                                    198/349.2
3,618,288 A   11/1971 Thornton et al.
(Continued)

FOREIGN PATENT DOCUMENTS

CN        2255965       6/1997
CN      101341084       1/2009
(Continued)

OTHER PUBLICATIONS

Chinese Office Action in corresponding application CN 201980012825.6 dated May 7, 2021 and English Translation.
(Continued)

*Primary Examiner* — Gene O Crawford
*Assistant Examiner* — Keith R Campbell
(74) *Attorney, Agent, or Firm* — Fildes & Outland, P.C.

(57) ABSTRACT

A grouping station includes first conveyor tracks for moving loading pallets to the grouping station and second conveyor tracks for forwarding the loading pallets from the grouping station. The first conveyor tracks and the second conveyor tracks are both arranged for two different handling directions of the loading pallets.

8 Claims, 6 Drawing Sheets

(51) Int. Cl.
*B65G 47/53* (2006.01)
*B65G 47/54* (2006.01)
*B65G 47/80* (2006.01)

(52) U.S. Cl.
CPC ............ *B65G 47/54* (2013.01); *B65G 47/80* (2013.01); *B65G 2201/0267* (2013.01); *B65G 2207/08* (2013.01); *B65G 2207/18* (2013.01)

(58) Field of Classification Search
CPC .... B65G 47/54; B65G 47/681; B65G 47/682; B65G 47/80; B65G 67/04; B65G 67/08; B65G 67/20; B65G 2201/0267; B65G 2207/08; B65G 2207/18
See application file for complete search history.

(56) References Cited

U.S. PATENT DOCUMENTS

| | | | | |
|---|---|---|---|---|
| 5,143,198 | A | * | 9/1992 | Hale .................. B65G 47/244 198/414 |
| 5,297,924 | A | | 3/1994 | Neri et al. |
| 5,564,264 | A | * | 10/1996 | DeCrane ................ B65G 47/54 53/251 |
| 6,390,766 | B1 | | 5/2002 | Craig et al. |
| 8,251,634 | B2 | * | 8/2012 | Kauhanen .............. B65G 67/20 414/389 |
| 9,567,171 | B2 | | 2/2017 | Iwama |
| 2006/0072990 | A1 | | 4/2006 | Suess |

FOREIGN PATENT DOCUMENTS

| | | |
|---|---|---|
| CN | 103381963 | 11/2013 |
| CN | 105383936 | 3/2016 |
| CN | 106029533 | 10/2016 |
| CN | 107416506 | 12/2017 |
| DE | 2747249 A1 * | 4/1979 |
| FR | 2750122 | 12/1997 |
| WO | 03/048010 | 6/2003 |

OTHER PUBLICATIONS

English language abstract of WO 03/048010.
English language abstract of CN 2255965.
English language abstract of CN 101341084.
English language abstract of CN 103381963.
English language abstract of CN 106029533 which is EP3107847.
Patent Registration Research Report, Finnish Application No. 20185145, dated Aug. 24, 2018.
International Search Report, International Application No. PCT/FI2019/050118, dated May 29, 2019.
English language translation of CN 107416506.
English language abstract of FR2750122.

* cited by examiner

GROUPING STATION FOR LOADING PALLETS

CROSS-REFERENCE TO RELATED APPLICATIONS

This application claims benefit of priority from International Patent Application No. PCT/FI2019/050118 filed Feb. 14, 2019, which claims benefit of priority from Finland Patent Application No. 20185145 filed Feb. 16, 2018, both of which are incorporated by reference in their entirety.

FIELD OF THE INVENTION

The invention relates to a grouping station for loading pallets, which includes first transfer means for transferring the loading pallets to the grouping station and second transfer means for forwarding the loading pallets from the grouping station.

BACKGROUND OF THE INVENTION

In goods handling, such as in storage and transportation, loading pallets are used, on top of which the goods are placed. Loading pallets permit the mechanical handling of goods. Loading pallets are of different types and sizes, but the most usual are dimensioned according to the cargo spaces and each other. CHEP is a world-wide producer of returnable loading pallets. The most usual CHEP loading pallets are the Euro pallet or the FIN pallet. The dimensions of the Euro pallet are 800×1200 mm correspondingly the dimensions of the FIN pallet are 1000×1200 mm. A 2400-mm wide cargo space can then be utilized efficiently. In addition, both types of loading pallet can be handled in the same warehouse. Along with wooden loading pallets there are now also plastic loading pallets.

When handling loading pallets individually, for example using a fork/lift truck, the loading pallet can be set in the cargo space with the short or long side in front. At the same time, different types of loading pallet can be used, so that the length of the cargo space can be utilized maximally. In automatic load formation this is generally impossible, or at least demands numerous devices. Each device is dimensioned for a specific type and orientation of the loading pallet. In practice there has been a specific device for loading loading pallets with the long side in front and a specific device for loading loading pallets with the short side in front. In addition, each device has been able to handle only a specific type of loading pallet.

SUMMARY OF THE INVENTION

The invention is intended to create a new type of grouping station for loading pallets, using which loading pallets can be handled more diversely than before using simpler devices than previously. The features of the grouping station according to the present invention are stated in the accompanying Claims. Using the grouping station according to the invention a loading pallet can be handled facing either way, in practice with the long side or the short side in front. In addition, using the same grouping station it is possible to handle different types of loading pallet. Thus using a single device the desired pallet orientation can be formed according to the cargo space used at the time and thus the cargo space can be utilized as well as possible.

BRIEF DESCRIPTION OF THE DRAWINGS

In the following, the invention is described in detail with reference to the accompanying drawing showing one embodiment of the invention, in which.

DETAILED DESCRIPTION OF THE INVENTION

Figure 1:
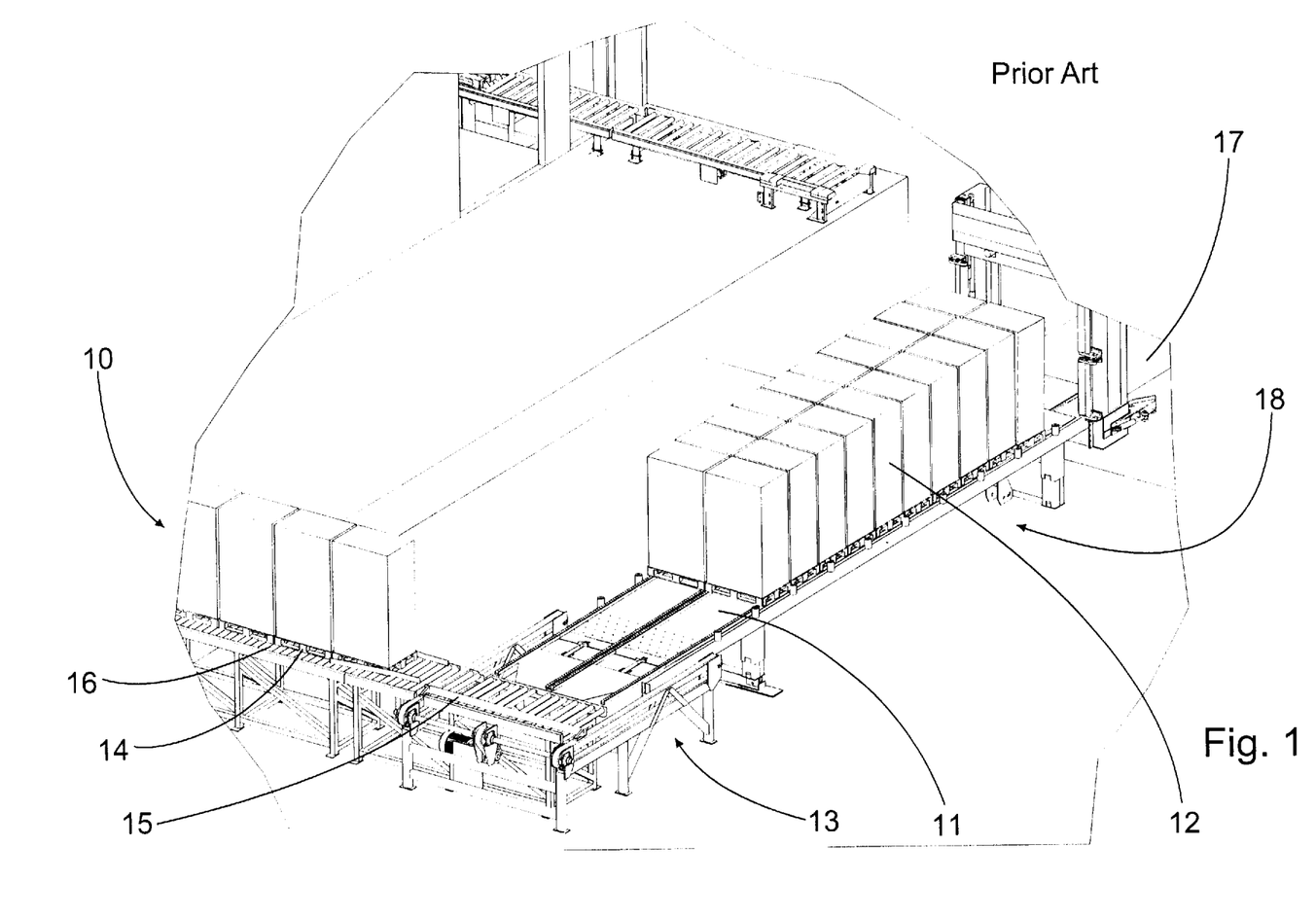
FIG. 1 shows a grouping station according to the prior art arranged as part of the goods-handing chain.

FIG. 1 shows a known conveyor system 10, in which a load is formed on a transfer plate 11. In other words, in forming a load a conveyor system 10 is used, by which the load units 12 are fed to a filling device 13 arranged in connection with the transfer plate 11. In practice the transfer plate 11 is moved using the transfer means 18, on top of which the load units 12 on the transfer plate 11 are pushed by the filling device 13 to form a load. Pushing is an advantageous and rapid way to move the loading pallets, as there are freely rotating rolling elements on the upper surface of the transfer plate. Here the load units 12 are pushed from the loading pallets 14 by using a buffer beam 15. The filling device then contains in itself a kind of grouping station, as two loading pallets are stopped on the end part of the roller track 16 and are pushed on top of the transfer plate 11 using the buffer beam 15. On the roller track 16 the loading pallets slide on top of rollers. In FIG. 1, the load is already ready on top of the transfer plate 11. Using the transfer means 18 the transfer plate 11 together with the load units 12 and the loading pallets 14 is pushed into the cargo space 17, such as, for example, a container or vehicle. The load is supported and simultaneously the transfer plate is pulled out of the cargo space, so that the load remains in the cargo space. After this, the filling device 13 is used to start forming the next load on top of the transfer plate 11.

Figure 2:
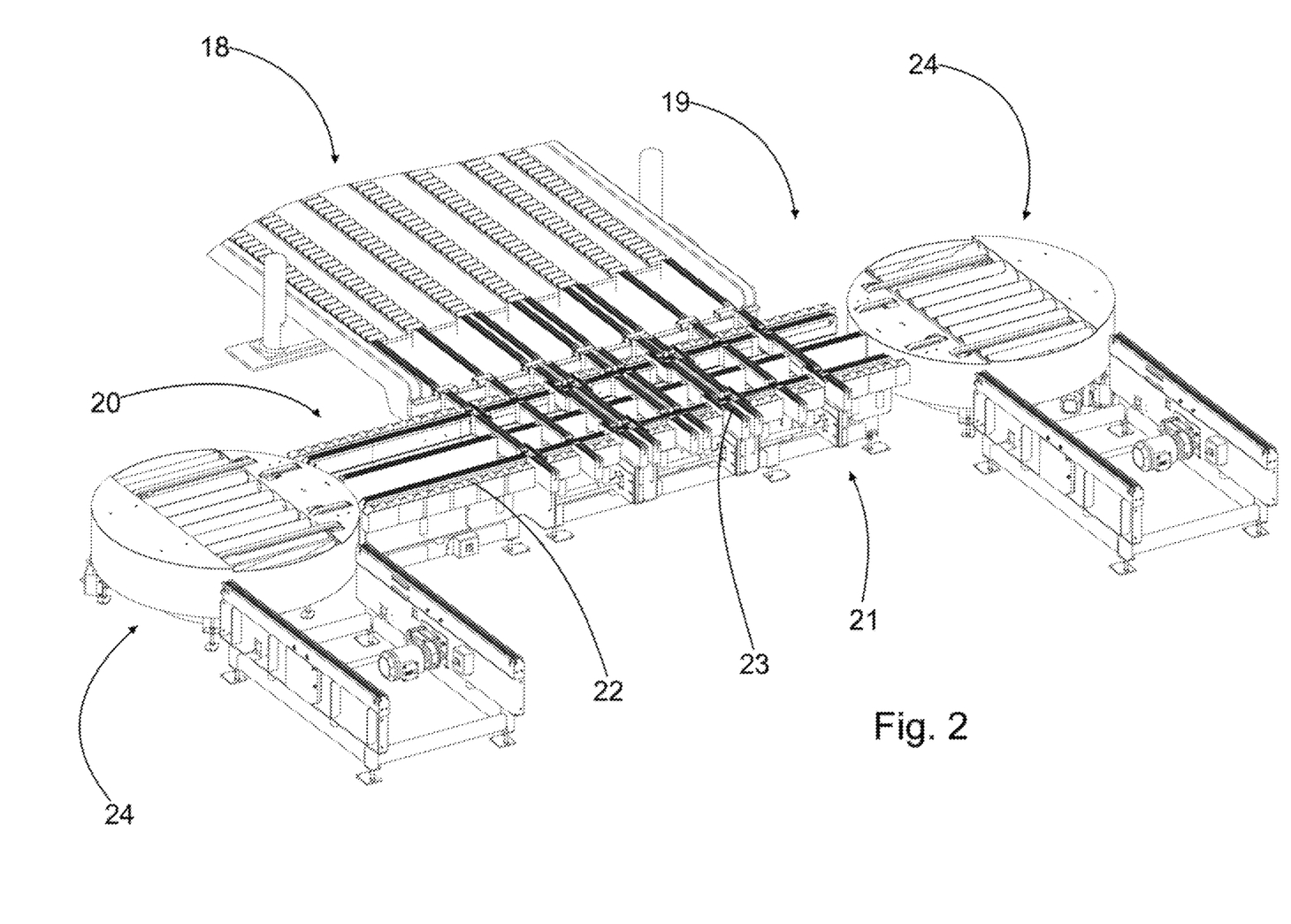
FIG. 2 shows an overall view of a grouping station according to the invention.
Figure 3:
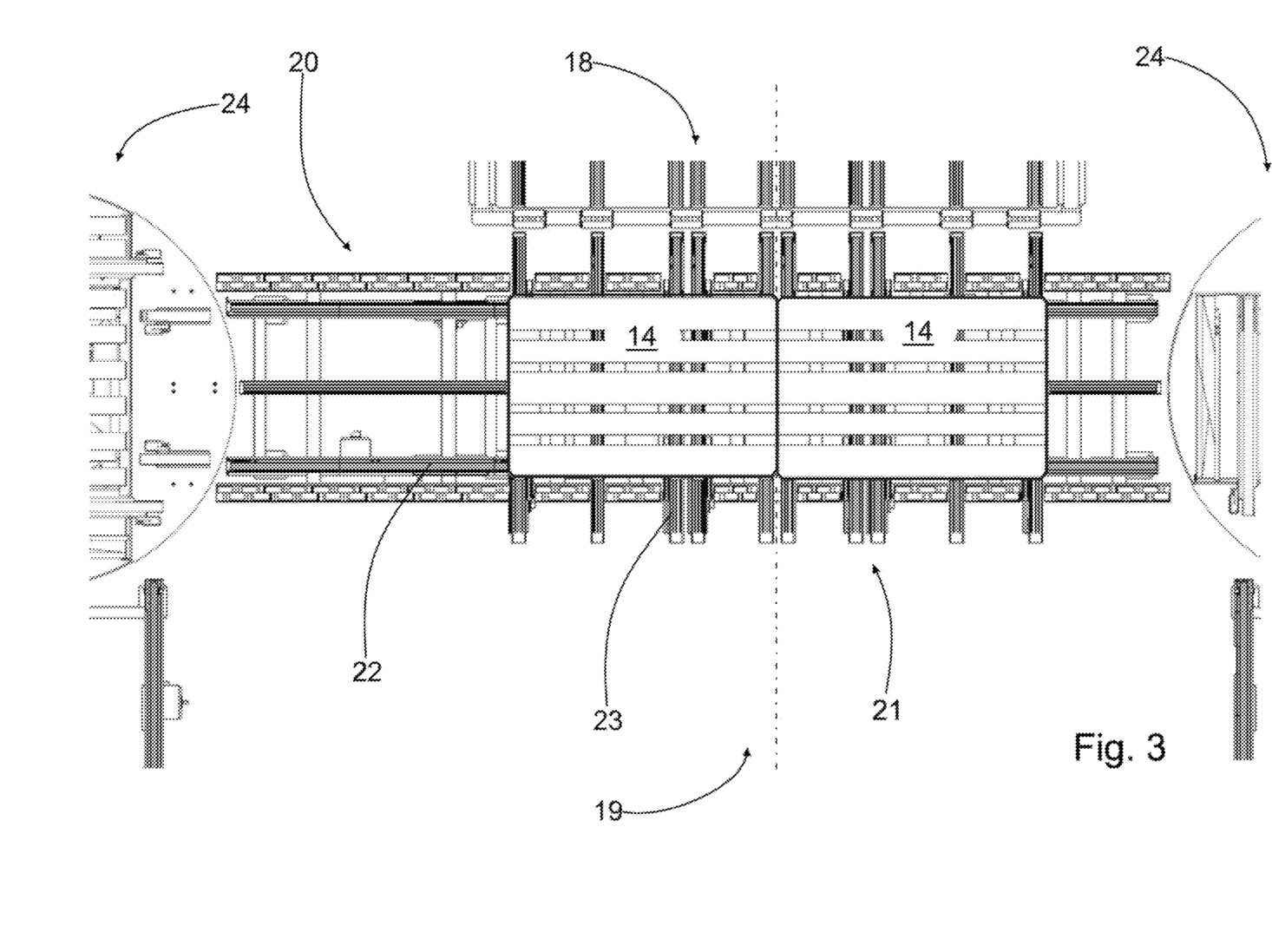
FIG. 3 shows the operation of the grouping station according to the invention with one pallet orientation.
Figure 4:
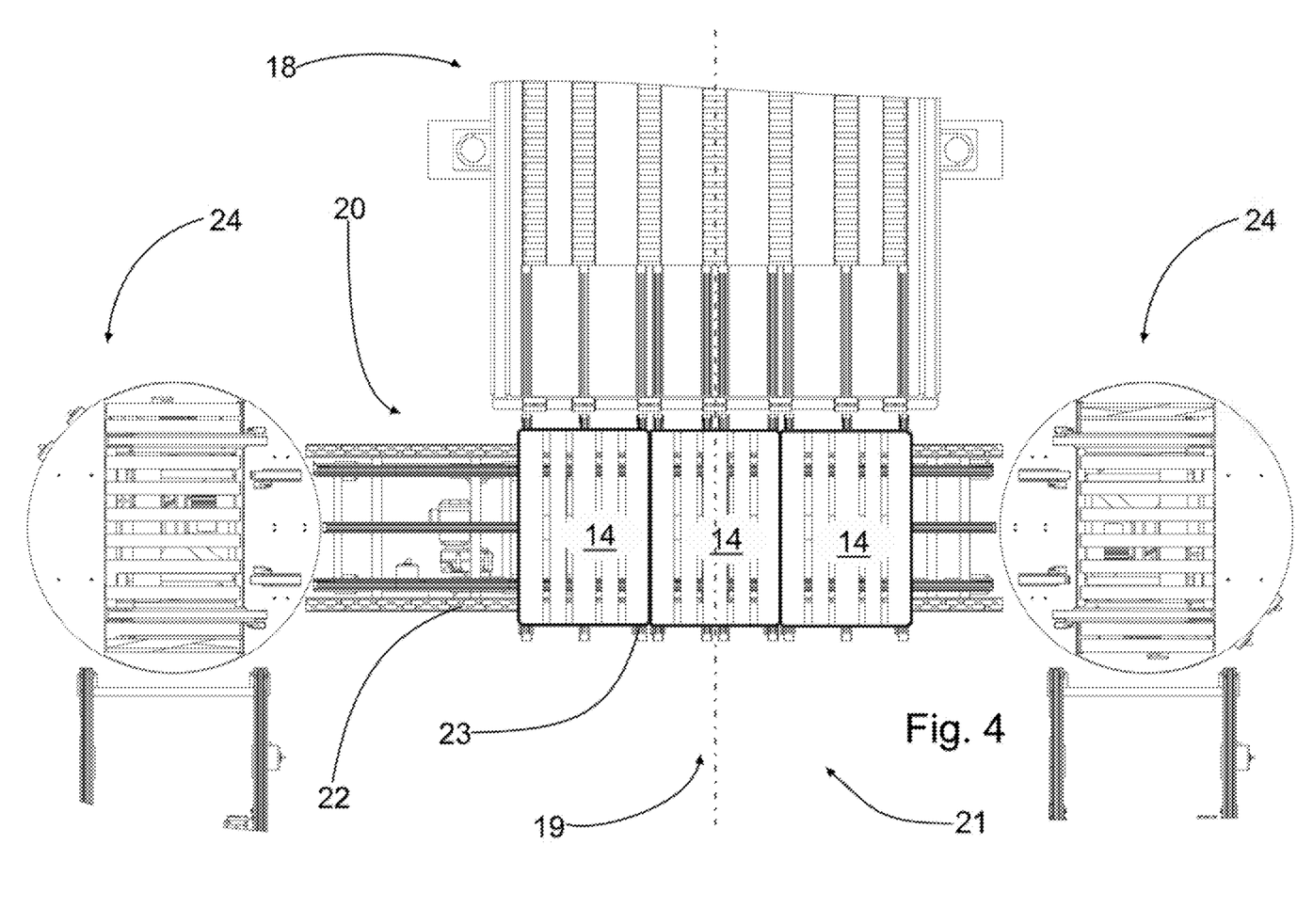
FIG. 4 shows the operation of the grouping station according to the invention with a second pallet orientation.

FIG. 2 shows a grouping station 19 for loading pallets according to the invention, which includes first transfer means 20 for moving the loading pallets 14 to the grouping station 19 and second transfer means 21 for forwarding the loading pallets 14 from the grouping station 19. FIGS. 3 and 4 show the loading pallets 14 and examples of their positioning. The first transfer means 20 and the second transfer means 21 are each arranged in two different handling directions of a loading pallet 14. Thus using one and the same device, i.e. the grouping station, a loading pallet can be handled in both of its handling directions, more specifically, with the short side or the long side in front. Thus the loading pallet can be handled in both handling directions.

More specifically, the said first transfer means 20 are formed of conveyor tracks 22 arranged in parallel, which are arranged for two different handling directions of a loading pallet 14. Correspondingly, the second transfer means 21 are formed of conveyor tracks 23 arranged in parallel, which are also arranged for two different handling directions of a loading pallet 14. A loading pallet can then be handled with either the short side and the long side in front. In practice, in both transfer means the parallel conveyor tracks are doubled or multiplied suitably, so that, despite the handling direction of the loading pallet, the loading pallet is sufficiently supported. This then avoids particularly problems with pallets that have a discontinuous base. In practice, for example a Euro pallet is a pedestal pallet, with base planks only longitudinally, so that when being handled with the long side in front the base planking is discontinuous. Correspondingly in a ring pallet, such as a FIN pallet, there is a base plank on all sides, so that there is no discontinuity.

In FIG. 3, the loading pallets 14 are moved on top of the transfer means 18 with the long side in front. The loading pallets 14 arrive at the grouping station 19 with the short side in front, from either the right or left sides. Correspondingly, in FIG. 4 the loading pallets 14 are moved on top of the transfer means 18 with the short side in front. The loading pallets 14 arrive at the grouping station 19 with the long side in front, from either the right or left sides. In a corresponding way, two FIN pallets can be handled with the long side in front.

In the grouping station according to the invention, the first transfer means 20 are arranged to assemble and centre two or three loading pallets 14 before forwarding the loading pallets 14 from the grouping station 19. An entire row of loading pallets 14 can then be pushed onto the transfer means 18 at one time. At the same time, thanks to centring the loading pallets 14 settle in the centre of the transfer plate, so that taking the load into the cargo space succeeds without re-positioning. FIGS. 3 and 4 show the centre point, according to which the loading pallets are centred, with a dot-and-dash line. In centring, the loading pallets are also run against each other, so that the load becomes dense.

In the embodiment shown, the longitudinal conveyor tracks 22 are formed of roller and/or chain conveyors. More specifically, the outermost are freely rotating roller tracks and in the middle are three chain conveyors. In addition, each roller track is formed of two rows of rollers, which are similar, but the location of the rollers is staged. This avoids the formation of discontinuity points between the rollers in the direction of travel of a loading pallet. Correspondingly, the transverse conveyor tracks 23 are formed of roller and/or chain conveyors. More specifically, here there are three conveyor units, in the outermost of which there are three chain conveyors. In the middle conveyor unit there are four chain conveyors. By means of the described arrangement there are then two chain conveyors in parallel, to that the loading pallets are supported irrespective of the handling direction and size of the loading pallet. The longitudinal conveyor tracks can be formed of roller tracks, which advantageously allows even long transfers to be made. The consecutive rollers are arranged closely enough to avoid a loading pallet falling between the rollers. Otherwise too the transportation means and the distances between them are arranged so that, despite a loading pallet's discontinuity points, the loading pallet will move without catching, never mind breaking.

Figure 6:
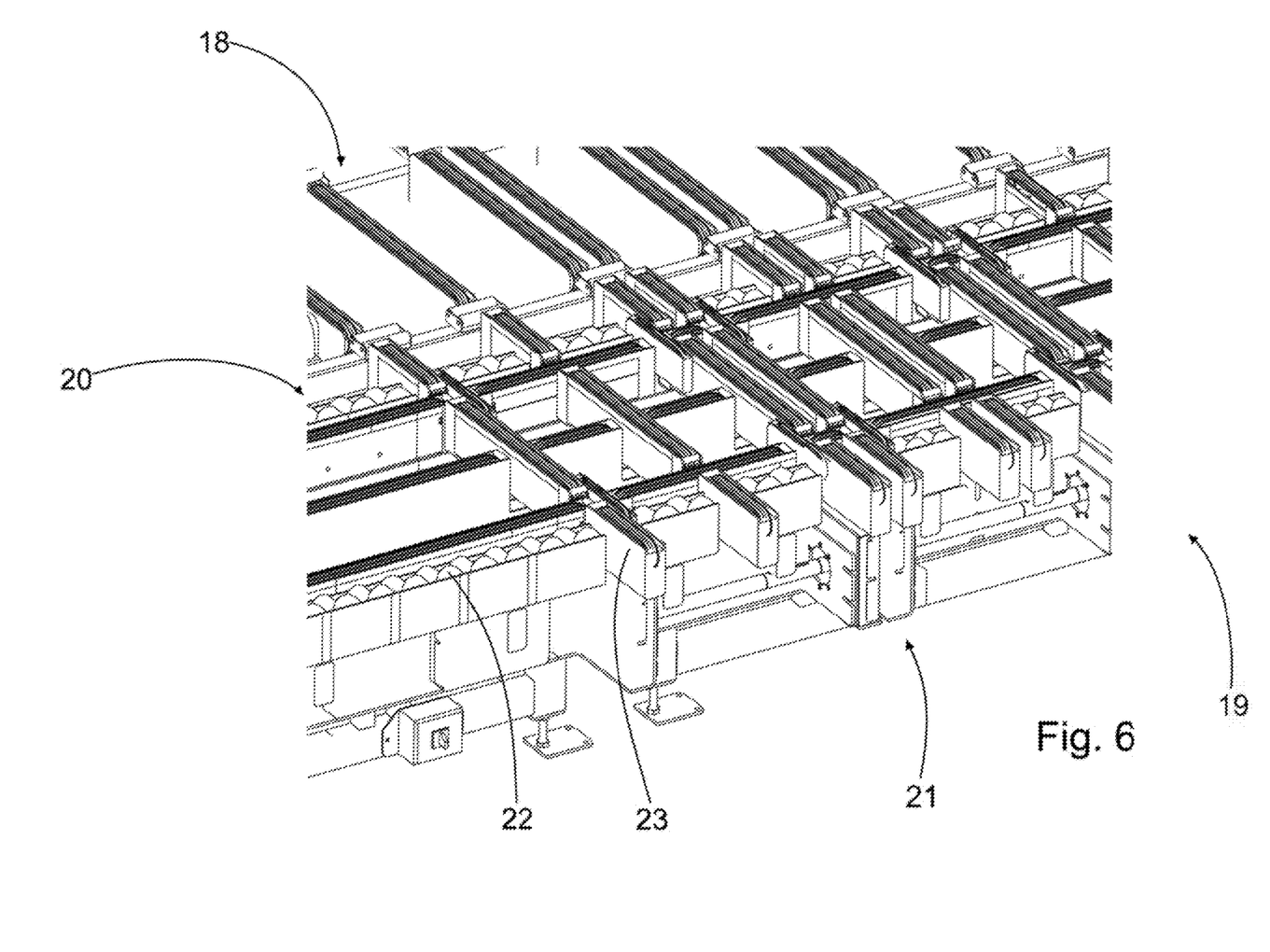
FIG. 6 shows a partial enlargement of FIG. 2.

In practice, the direction of movement of the first transfer means 20 is transverse to the direction of movement of the second transfer means 21. The grouping station is then made compact. In addition, the conveyor tracks 22 and 23 are arranged crosswise and overlapping, which further reduces the need for space. Discontinuity points can then be formed at the crossover points, but they are so small that, despite the handling direction, the loading pallet moves. In practice, the first transfer means 20 and the second transfer means 21 are arranged to be set on different levels vertically. When using the longitudinal conveyor tracks the transverse conveyor tracks are not used. In specific cases, it can be decided which of the longitudinal and transverse directions move up-down. In the embodiment shown, the transverse conveyor tracks are below, when two or three loading pallets are brought to the grouping station on the longitudinal conveyor tracks. In other words, the transverse conveyor tracks are below and rise when taking loading pallets on top of the transfer means. In the embodiment shown, the transverse conveyor tracks move in a vertical direction and correspondingly the longitudinal conveyor tracks are fixed. In FIG. 6, the transverse conveyor tracks 23 are in the upper position, so that they are clearly higher than the longitudinal conveyor tracks 22. The trade name of the transfer means made by the applicant for handling a transfer plate is LoadMatic®.

In the embodiment shown, the grouping station includes a combined turning and crossing station 24 for loading pallets 14, with which the direction of a loading pallet is defined, in practice arranged as desired. Then, for example, a loading pallet coming from an automatic warehouse can come any way round at all and the loading pallet will be turned to the desired direction immediately before the grouping station. In FIG. 2, there is a turning and crossing station 24 at both ends of the grouping station and both include a short feed conveyor, to which loading pallets are brought in one way or another, for example by a fork-lift truck or a conveyor arrangement. FIG. 3 shows the turning and crossing station 24 only partly.

The grouping station according to the invention is automatic, independent of the pallet orientation, and suitable for different loading pallets of different sizes. Loading pallets can be more simply termed pallets. For example, in a 2400-mm wide cargo space, two Euro pallets can be placed in parallel with the long side in front (2×1200 mm=2400 mm), or three Euro pallets with the short side in front (3×800 mm=2400 mm), or two FIN pallets with the long side in front (2×1200 mm=2400 mm). By suitably combining these combinations the length of the cargo space too can be utilized maximally.

In the embodiment shown, there is one motor each in the first transfer means 20 and in the second transfer means 21. A third motor is used to move the transfer means vertically to different levels. The grouping station according to the invention then contains the same functions as three known crossing stations, in which there would be a total of nine motors. In general, the number of motors is minimized in the grouping station according to the invention.

Figure 5A:
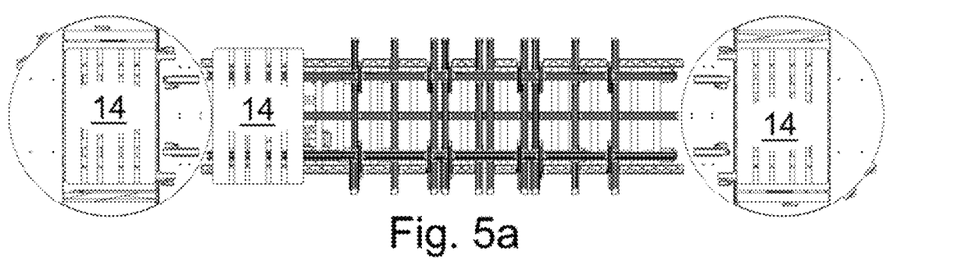
FIGS. 5a-5d show the stages of the operation of the grouping station.
Figure 5B:
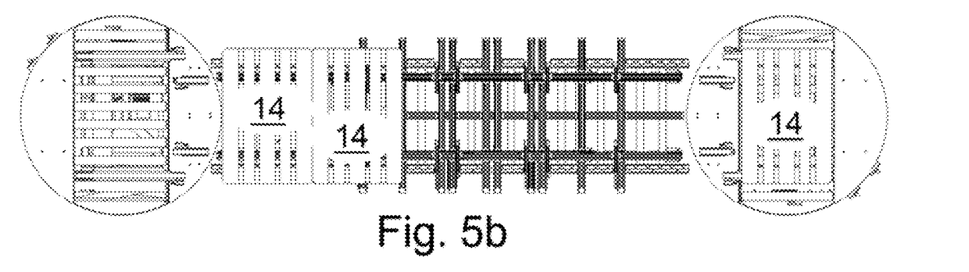
Figure 5C:
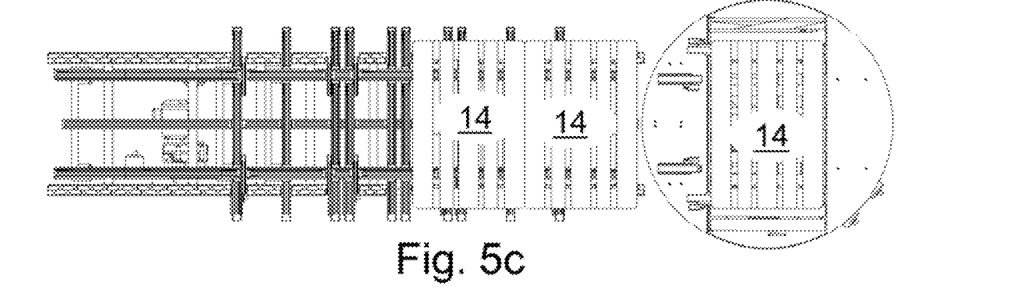
Figure 5D:
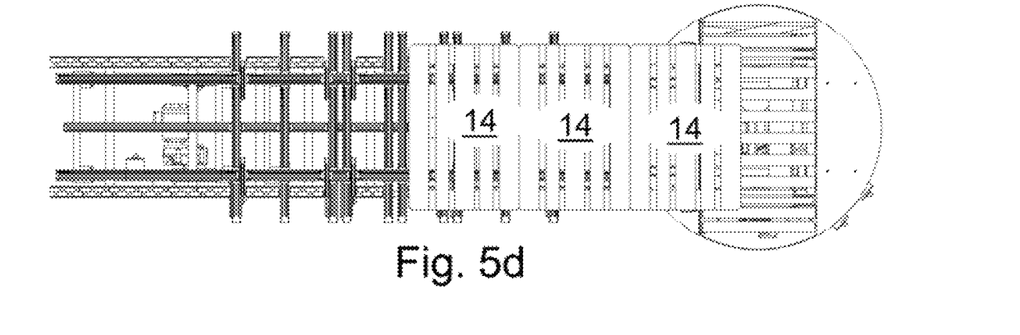

The stages preceding the situation of FIG. 4 are shown in FIGS. 5a-5d. Here what is shown is how the loading pallets 14 are run against each other and centred, in practice using a single motor. In FIG. 5a, one loading pallet 14 is already at the grouping station and two other loading pallets 14 are waiting at the turning and crossing station. In FIG. 5a, there is a second loading pallet 14 fed from the left next to the first one. Next the two first loading pallets 14 are moved together to the right-hand turning and crossing station, at which a third loading pallet 14 is fed next to the first one (FIG. 5d). All three loading pallets 14 are then in the desired loading direction and against each other. The three loading pallets 14 are then moved to the left until the centre point is reached.

The grouping station according to the invention is suitable for handling a loading pallet in both of its handling directions. The grouping station can also be used for other types and sizes of loading pallet, within certain limits. In the grouping station, the loading pallets can be either way round, with either the short side or long side in front. Thus the grouping station is pallet-orientation-independent. Further, at the grouping station the loading pallets are brought against each other, thus effectively utilizing the cargo space and making the load sturdy.

The invention claimed is:

1. Grouping station for loading pallets, which includes first conveyor tracks arranged in parallel, which are arranged for two different handling directions of the loading pallets for transferring the loading pallets to the grouping station and second conveyor tracks arranged in parallel, which are arranged for two different handling directions of the loading pallets for forwarding the loading pallets from the grouping station, characterized in that the grouping station is arranged for at least two different sizes of loading pallets having a discontinuous base area, and the first conveyor tracks and the second conveyor tracks are both arranged for two different handling directions of the loading pallets, the grouping station including a combined turning and crossing station for loaded pallets and defining the handling direction of the loaded pallets, and the first conveyor tracks assemble and center two or three loading pallets before forwarding the loading pallets from the grouping station.

2. Grouping station according to claim 1, characterized in that the first and second conveyor tracks are formed of roller and/or chain conveyors.

3. Grouping station according to claim 1, characterized in that the first conveyor tracks and the second conveyor tracks are arranged to be set at different levels vertically, so that the conveyor tracks being used at any time is higher than the conveyor tracks not being used.

4. Grouping station according to claim 3, characterized in that the direction of movement of the first conveyor tracks is transverse to the direction of movement of the second conveyor tracks.

5. Grouping station according to claim 4, characterized in that the conveyor tracks are arranged to cross and overlap.

6. Grouping station according to claim 1, characterized in that the size of the loading pallet is 800×1200 mm or 1000×1200 mm.

7. Grouping station according to claim 1, characterized in that the loading pallet is a pedestal pallet.

8. Grouping station according to claim 1, characterized in that there is one motor each in the first conveyor tracks and the second conveyor tracks.

* * * * *